United States Patent
Hirose et al.

(10) Patent No.: US 11,914,343 B2
(45) Date of Patent: Feb. 27, 2024

(54) COMMAND GENERATION DEVICE AND COMMAND GENERATION METHOD TO CONTROL MOTOR

(71) Applicant: KABUSHIKI KAISHA YASKAWA DENKI, Kitakyushu (JP)

(72) Inventors: Kenichi Hirose, Kitakyushu (JP); Yasuhiro Suzuki, Kitakyushu (JP); Atsuro Tandai, Kitakyushu (JP); Kenshiro Yokoi, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 440 days.

(21) Appl. No.: 17/337,424

(22) Filed: Jun. 3, 2021

(65) Prior Publication Data
US 2021/0405614 A1 Dec. 30, 2021

(30) Foreign Application Priority Data
Jun. 25, 2020 (JP) .................. 2020-109668

(51) Int. Cl.
*G05B 19/18* (2006.01)
*G05B 19/4103* (2006.01)
(Continued)

(52) U.S. Cl.
CPC ....... *G05B 19/4103* (2013.01); *G05B 19/253* (2013.01); *G05B 19/4141* (2013.01); *G05D 13/62* (2013.01)

(58) Field of Classification Search
CPC ......... G05D 13/62; G05B 19/253; H02P 6/06; H02P 2205/07; H02P 5/46; H02P 8/14
See application file for complete search history.

(56) References Cited

U.S. PATENT DOCUMENTS

| 2019/0359247 A1 | 11/2019 | Tsubaki |
| 2020/0140064 A1 | 5/2020 | Liscouet et al. |
| 2020/0319622 A1* | 10/2020 | Fujiwara ............ H02P 23/04 |

FOREIGN PATENT DOCUMENTS

WO WO 2015/177912 11/2015

OTHER PUBLICATIONS

David Bowling, "Advances in Motion Profiling", Dissertation, Jan. 2008, pp. 1-227, XP055480360, US, Url: https://search.proquest.com/docview/304526053?accountid=29404 See cite No. 4.

(Continued)

*Primary Examiner* — Karen Masih
(74) *Attorney, Agent, or Firm* — MORI & WARD, LLP

(57) ABSTRACT

A command generation device to control a motor includes command input circuitry configured to receive a first command, first intermediate data calculation circuitry configured to calculate first intermediate data based on the first command, delay time setting circuitry configured to determine a delay time based on the first command, second intermediate data calculation circuitry configured to calculate second intermediate data by smoothing the first intermediate data based on the delay time, and command output circuitry configured to calculate, based on the second intermediate data, a second command according to which the motor is controlled. A first time period during which positioning the motor based on the first command is completed when the first intermediate data is smoothed is longer by the delay time than a second time period during which positioning the motor based on the first command is completed when the first intermediate data is not smoothed.

12 Claims, 9 Drawing Sheets

(51) Int. Cl.
*G05B 19/25* (2006.01)
*G05B 19/414* (2006.01)
*G05D 13/62* (2006.01)

(56) References Cited

OTHER PUBLICATIONS

Extended European Search Report for corresponding EP Application No. 21175608.5-1202, dated Nov. 29, 2021.
Chinese Office Action for corresponding CN Application No. 202110692602.8, dated Sep. 26, 2023 (w/ English machine translation).

* cited by examiner

COMMAND GENERATION DEVICE AND COMMAND GENERATION METHOD TO CONTROL MOTOR

CROSS-REFERENCE TO RELATED APPLICATIONS

The present application claims priority under 35 U.S.C. § 119 to Japanese Patent Application No. 2020-109668, filed Jun. 25, 2020. The contents of this application are incorporated herein by reference in their entirety.

BACKGROUND OF THE INVENTION

Field of the Invention

The present embodiment relates to a command generation device to a control motor and a command generation method to a control motor.

Discussion of the Background

International Publication No. WO/2015/177912 describes a command generation device that generates a drive command to be supplied to a servo system in each control cycle. The command generation device includes a time function processing unit that generates an intermediate command for each control cycle for accelerating/decelerating the speed according to a time function obtained by adding a linear function and a sinusoidal function for one cycle in an acceleration/deceleration section based on an input from a user, and a filter unit that generates a drive command by applying a filter that removes a preset frequency component to the intermediate command.

SUMMARY OF THE INVENTION

According to one aspect of the present invention, a command generation device to control a motor includes command input circuitry configured to receive a first command, first intermediate data calculation circuitry configured to calculate first intermediate data based on the first command, delay time setting circuitry configured to determine a delay time based on the first command, second intermediate data calculation circuitry configured to calculate second intermediate data by smoothing the first intermediate data based on the delay time, and command output circuitry configured to calculate, based on the second intermediate data, a second command according to which the motor is controlled. A first time period during which positioning the motor based on the first command is completed when the first intermediate data is smoothed is longer by the delay time than a second time period during which positioning the motor based on the first command is completed when the first intermediate data is not smoothed.

According to another aspect of the present invention, a command generation method to control a motor includes receiving a first command, calculating first intermediate data based on the first command, determining a delay time based on the first command, smoothing the first intermediate data based on the delay time to obtain second intermediate data, and calculating, based on the second intermediate data, a second command according to which the motor is controlled. A first time period during which positioning the motor based on the first command is completed when the first intermediate data is smoothed is longer by the delay time than a second time period during which positioning the motor based on the first command is completed when the first intermediate data is not smoothed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF EMBODIMENTS

Hereinafter, an embodiment will be described with reference to the drawings.

1. Overall Configuration of Motor Control System

First, an example of an overall configuration of a motor control system 1 according to the present embodiment will be described with reference to FIG. 1.

Figure 1:
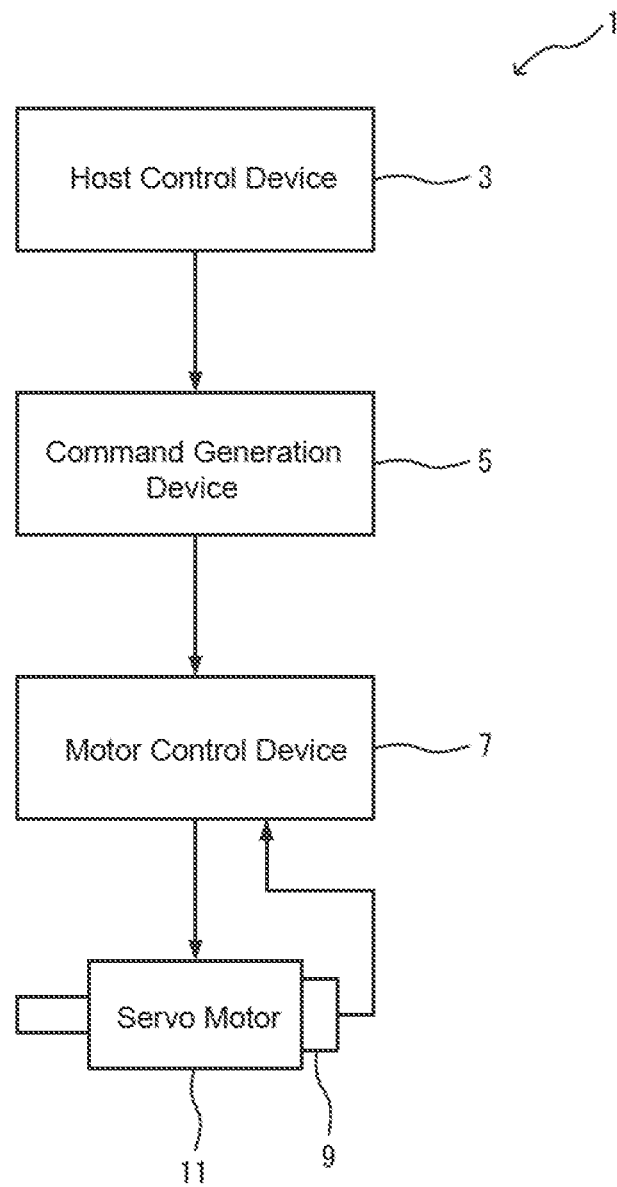
FIG. 1 is a system configuration diagram illustrating an example of an overall configuration of a motor control system.

As shown in FIG. 1, the motor control system 1 includes a host control device 3, a command generation device 5, a motor control device 7, and a servo motor 11 including an encoder 9.

The host control device 3 outputs a first command for controlling the servo motor 11 to the command generation device 5. The "first command" is a command defining how to drive the servo motor 11, and is, for example, a movement amount. Note that the first command may be, for example, a position command or a speed command, and the type of the command is not limited as long as a waveform of a command speed V1 described later can be specified in the command generation device 5.

The command generation device 5 generates a second command for controlling the servo motor 11 based on the first command output from the host control device 3, and outputs the second command to the motor control device 7. The "second command" is, for example, a position command. The second command may be a command other than the position command, for example, a speed command.

The motor control device 7 controls the servo motor 11 based on the second command output from the command generation device 5. For example, when the second command is a position command, the motor control device 7 performs position feedback control based on the drive position detected by the encoder 9 so that the drive position of the servo motor 11 follows the position command. Further, for example, when the second command is a speed command, the motor control device 7 performs speed feedback control based on the driving speed detected by the encoder 9 so that the driving speed of the servo motor 11 follows the speed command.

The servo motor 11 (an example of a motor) drives an industrial machine (not shown) such as a robot, a processing machine, or a machine tool. The servo motor 11 includes an encoder 9 that detects a driving state (a driving position or a driving speed) of the servo motor 11. The encoder 9 outputs the detection result to the motor control device 7. Although not shown, the motor control devices 7 and the servomotors 11 are provided in the number corresponding to the number of axes of the industrial machine.

The host control device 3 or the command generation device 5 described above may be, for example, a motion controller or may be a general-purpose personal computer (PC). Alternatively, it may be configured by a programmable logic controller (PLC) or the like.

All or a part of the host control device 3, the command generation device 5, and the motor control device 7 described above may be configured as an integrated control device instead of a separate body. Further, any one of the devices among the host control device 3, the command generation device 5, and the motor control device 7 may be configured by a plurality of control devices.

2. Functional Configuration of Command Generation Device 5

Next, an example of a functional configuration of the command generation device 5 will be described with reference to FIG. 2.

Figure 2:
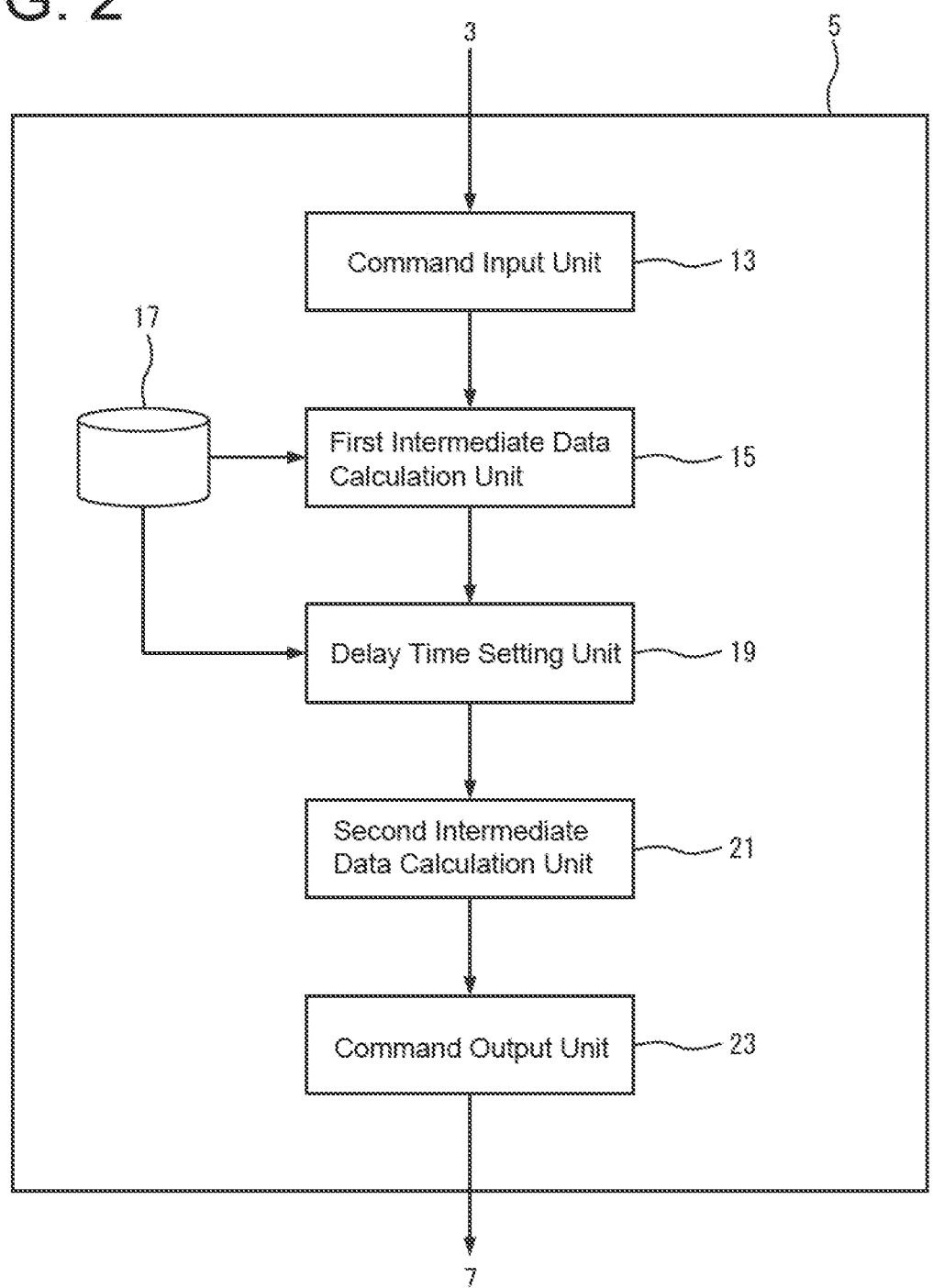
FIG. 2 is a functional block diagram illustrating an example of a functional configuration of the command generation device.

As illustrated in FIG. 2, the command generation device 5 includes a command input unit (command input circuitry) 13, a first intermediate data calculation unit (first intermediate data calculation circuitry) 15, a recording unit 17, a delay time setting unit (delay time setting circuitry) 19, a second intermediate data calculation unit (second intermediate data calculation circuitry) 21, and a command output unit (command output circuitry) 23.

The command input unit 13 is to input a first command according to which the servo motor 11 output from the host control device 3 is controlled. As described above, the first command is, for example, a movement amount.

The first intermediate data calculation unit 15 is to calculate first intermediate data based on the first command. The "first intermediate data" is, for example, the command speed before smoothing. To be specific, the recording unit 17 records an upper limit value of the command speed V1 set in advance, accelerations, decelerations, and the like. The first intermediate data calculation unit 15 calculates a command speed V1 that changes along a trapezoidal waveform, for example, based on the movement amount input from the host control device 3 and the upper limit values, accelerations, and decelerations recorded in the recording unit 17.

The delay time setting unit 19 is to variably set, based on the first command, a delay time by which a first completion time is delayed with respect to a second completion time, positioning of the motor according to the first command being completed at the first completion time if the first intermediate data is smoothed, the positioning of the motor according to the first command being completed at the second completion time if the first intermediate data is not smoothed. The "smoothing" is, for example, smoothing by using a moving average filter. If the delay time can be set, smoothing other than moving averaging may be performed.

To be specific, the delay time setting unit 19 sets the delay time to be shorter than a preset initial value when the maximum value of the command speed calculated by the first intermediate data calculation unit 15 does not reach a preset upper limit value of the command speed. Hereinafter, the movement amount when the maximum value of the command speed does not reach the upper limit value of the command speed is appropriately referred to as a "minute movement amount". The initial value of the delay time is set in advance and recorded in the recording unit 17.

For example, the delay time setting unit 19 calculates the delay time by multiplying the initial value of the delay time by the ratio of the maximum value to the upper limit value of the command speed based on the following (Equation 1).

$$DT = DT_o \times (V_{max}/V_{lim}) \qquad \text{(Equation 1)}$$

DT denotes a delay time, DTo denotes an initial value of the delay time, Vmax denotes a maximum value of the command speed calculated by the first intermediate data calculation unit 15, and Vlim denotes a preset upper limit value of the command speed.

If the delay time can be made shorter than the initial value in the case of a minute movement amount, the method of calculating the delay time may be other than the above.

The second intermediate data calculation unit 21 is to calculate second intermediate data obtained by smoothing the first intermediate data based on the delay time calculated by the delay time setting unit 19. The "second intermediate data" is, for example, the command speed after smoothing. That is, the second intermediate data calculation unit 21 calculates the command speed that changes along a waveform obtained by smoothing a trapezoidal waveform, for example, based on the command speed before smoothing calculated by the first intermediate data calculation unit 15 and the delay time calculated by the delay time setting unit 19.

The command output unit 23 is to output, based on the second intermediate data calculated by the second intermediate data calculation unit 21, to the motor control device 7, a second command according to which the servo motor 11 is controlled. As described above, the second command is, for example, a position command. That is, the command output unit 23 outputs the position command indicating the movement amount for each control cycle based on the command speed after smoothing calculated by the second intermediate data calculation unit 21.

In principle, the command generation device 5 generates in advance all command data until the positioning is completed before outputting the second command and starting the positioning operation of the servo motor 11. That is, the first intermediate data calculation unit 15 calculates the first intermediate data until the positioning is completed, the delay time setting unit 19 sets the delay time based on the first intermediate data, the second intermediate data calculation unit 21 calculates the second intermediate data until the positioning is completed based on the delay time, and the command output unit 23 starts the output of the second command.

However, when the first command is changed during the positioning operation of the servo motor 11 (during the output of the second command), the first intermediate data and the second intermediate data are recalculated during the positioning operation, and the second command is output based on the updated second intermediate data. At this time, the delay time setting unit 19 calculates the delay time when the first command is input by the command input unit 13 while the second command is not output by the command output unit 23. Therefore, when the first command is input (changed) during the positioning operation of the servo motor 11, the delay time setting unit 19 does not recalculate the delay time, and the delay time is not changed. As a result, the second intermediate data is recalculated based on the delay time set before the change of the first command.

However, when the operation direction of the servo motor 11 is reversed by changing the first command, for example, the delay time is recalculated. That is, in a state where the second command is output by the command output unit 23, for example, when the first command is changed by the command input unit 13, the delay time setting unit 19 calculates the delay time at the time of the operation direction of the servo motor 11 being reversed. As a result, the second intermediate data is recalculated based on the delay time reset after the change of the first command. In addition to the case where the operation direction of the servo motor 11 is reversed, for example, in the case where the command speed once becomes 0 due to the change of the first command and then the servo motor 11 operates in the same operation direction again, the delay time may be recalculated at the time of the command speed V1 becoming 0.

The processing in the command input unit 13, the first intermediate data calculation unit 15, the delay time setting unit 19, the second intermediate data calculation unit 21, the command output unit 23, and the like described above is not limited to the example of the sharing of the processing. For example, the processing may be performed by a smaller number of processing units (for example, one processing unit), or may be performed by more subdivided processing units. The above-described processing functions may be implemented by a program executed by a CPU901 (see FIG. 13) to be described later, or a part or all of the processing functions may be implemented by an actual device such as an ASIC, an FPGA, or other electric circuits.

3. Waveforms of First Intermediate Data and Second Intermediate Data

Next, specific examples of waveforms representing temporal changes of the first intermediate data and the second intermediate data will be described with reference to FIGS. 3 to 11. Here, for example, a case where the first command is the movement amount, the first intermediate datum and the second intermediate datum are the command speed, the second command is the position command, and smoothing by the moving average is performed will be described.

Figure 3:
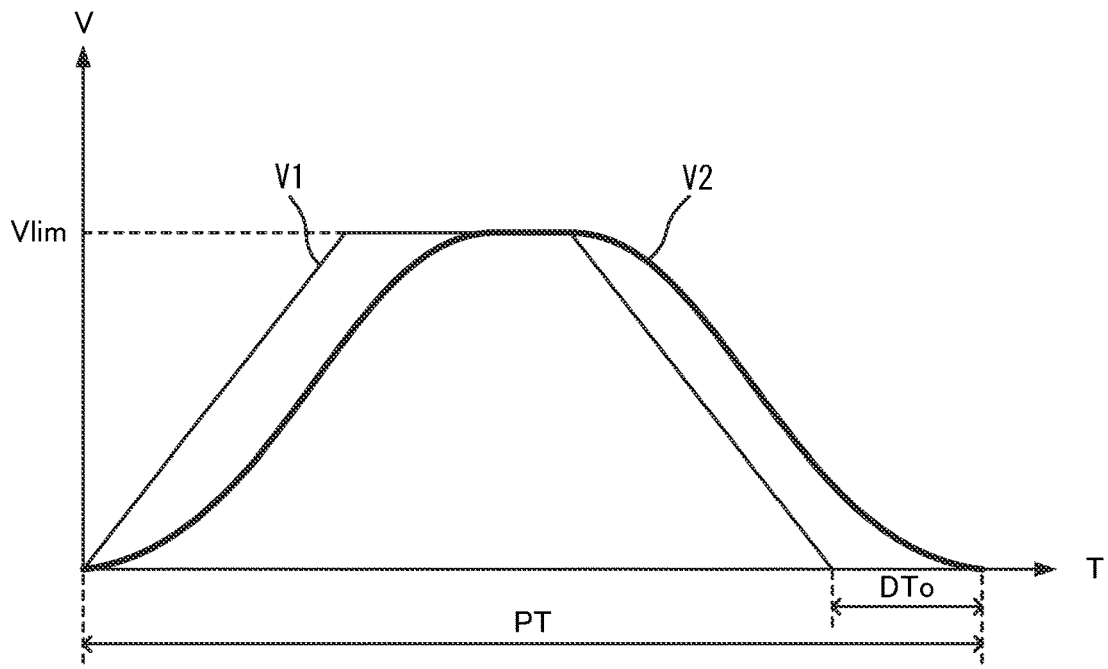
FIG. 3 is a waveform diagram illustrating an example of temporal changes in the command speed before smoothing and the command speed after smoothing.

FIG. 3 shows an example of temporal changes of the command speed V1 before smoothing and the command speed V2 after smoothing. As shown in FIG. 3, the command speed V1 (an example of the first intermediate data and the first command speed) changes along a trapezoidal waveform. That is, the command speed V1 is accelerated based on a preset acceleration, becomes constant at a preset upper limit value Vlim, and is decelerated based on a preset deceleration. The command speed V2 (an example of a second intermediate data and the second command speed) changes along a waveform obtained by smoothing a trapezoidal waveform by a moving average filter. By smoothing with the moving average, the time PT until the positioning is completed is delayed by the delay time DTo as compared with the time before the smoothing is performed. The delay time DTo is an initial value set in advance based on the smoothing to be executed. The command speed V1 or the cumulative value of the time integral value of each control cycle of the command speed V2 (the areas of the waveforms) coincides with the movement amount.

Figure 4:
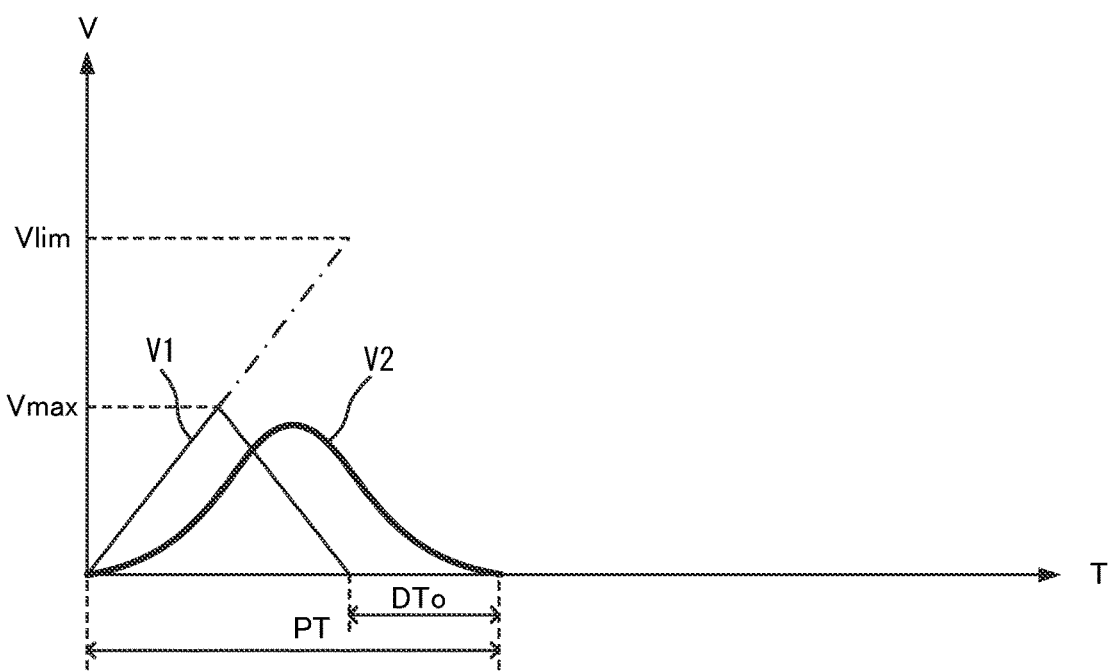
FIG. 4 is a waveform diagram illustrating an example of temporal changes in the command speed before smoothing and the command speed after smoothing in the case of a minute movement amount.

FIG. 4 shows an example of the command speed V1 and the temporal change of the command speed V2 in the case of a minute movement amount. FIG. 4 shows the command speed V1 and the command speed V2 when the delay time is fixed to the initial value DTo for comparison with the present embodiment. When the delay time DTo is constant, as the movement amount decreases, the ratio of the delay time DTo to the time PT until the positioning is completed gradually increases, and the influence of the delay time increases. In particular, as shown in FIG. 4, when the movement amount is so small that the maximum value Vmax of the command speed V1 does not reach the upper limit value Vlim, the ratio of the delay time DTo to the time PT until the positioning is completed becomes significantly large, and the influence of the delay time becomes significant.

Therefore, in the present embodiment, the delay time DT is kept at the initial value DTo when the amount of movement is not small, and the delay time DT is so as to be shorter than the initial value DTo based on (Expression 1) described above when the movement amount is small.

Figure 5:
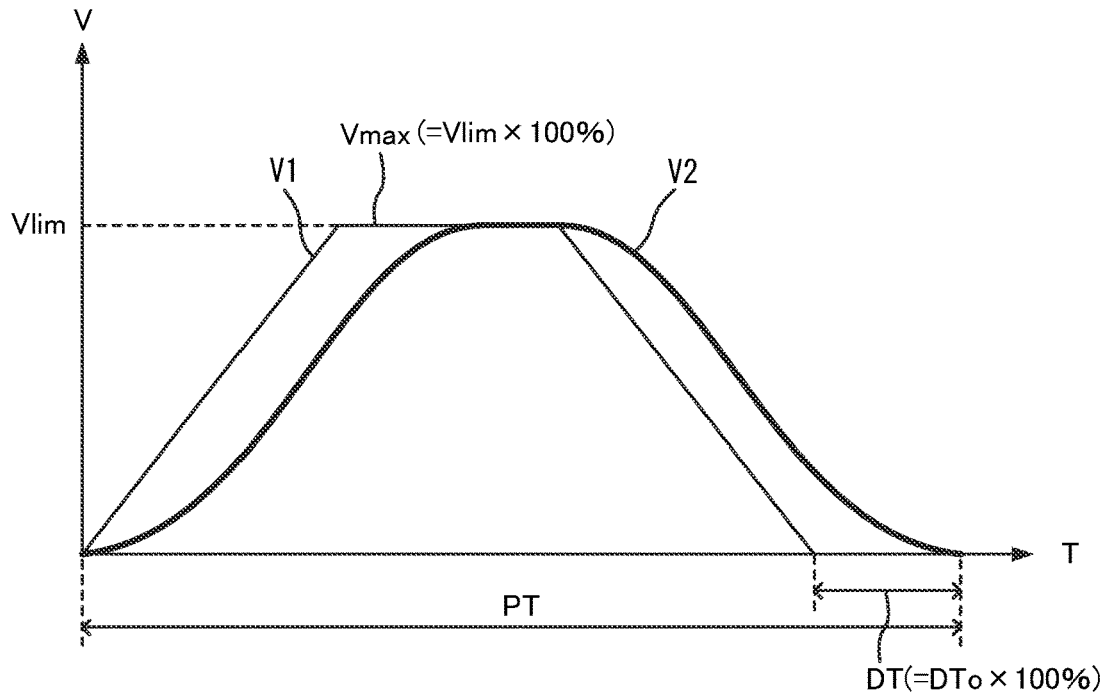
FIG. 5 is a waveform diagram illustrating an example of temporal changes in the command speed before smoothing and the command speed after smoothing in a case where the movement amount is not minute and there is a constant speed section.
Figure 6:
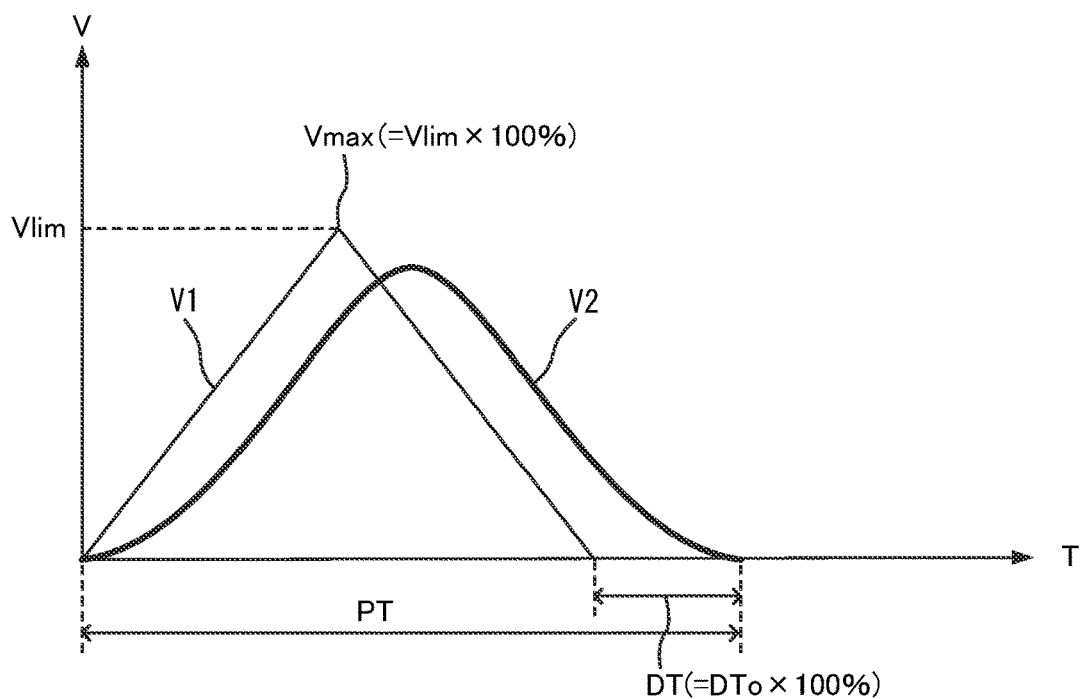
FIG. 6 is a waveform diagram illustrating an example of temporal changes in the command speed before smoothing and the command speed after smoothing in a case where the movement amount is not minute and there is no constant speed section.

FIGS. 5 and 6 show an example of the temporal change of the command speed V1 and the command speed V2 in the case where the movement amount is not minute. FIG. 5 shows a case where, for example, there is a section in which the maximum value Vmax of the command speed V1 reaches the upper limit value Vlim and the command speed V1 becomes constant at the upper limit value Vlim. FIG. 6 shows a case where, for example, there is no section in which the maximum value Vmax of the command speed V1 reaches the upper limit value Vlim and the command speed V1 becomes constant at the upper limit value Vlim. In the examples shown in FIGS. 5 and 6, since the maximum value Vmax is equal to the upper limit value Vlim (=Vlim×100%), the delay time DT remains at the initial value DTo (=DTo×100%) based on (Equation 1).

Figure 7:
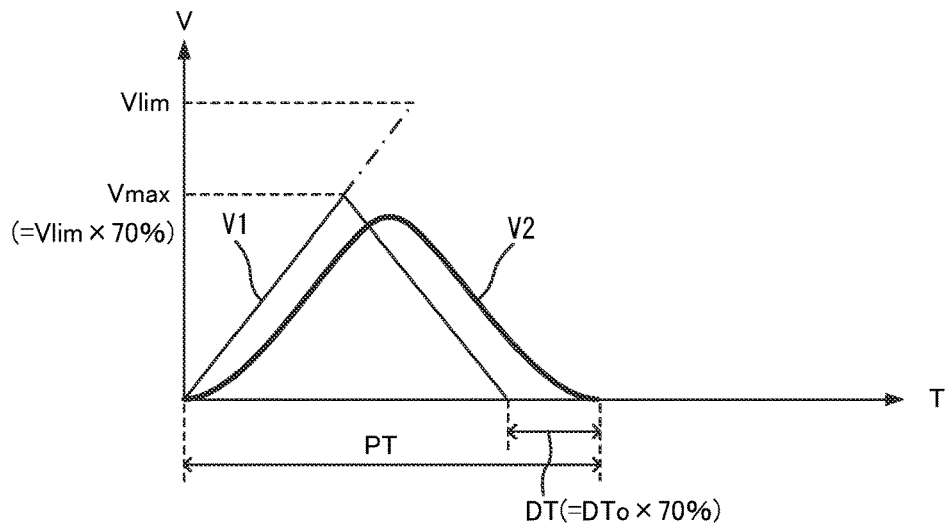
FIG. 7 is a waveform diagram illustrating an example of temporal changes in the command speed before smoothing and the command speed after smoothing when the maximum value of the command speed is 70% of the upper limit value.
Figure 8:
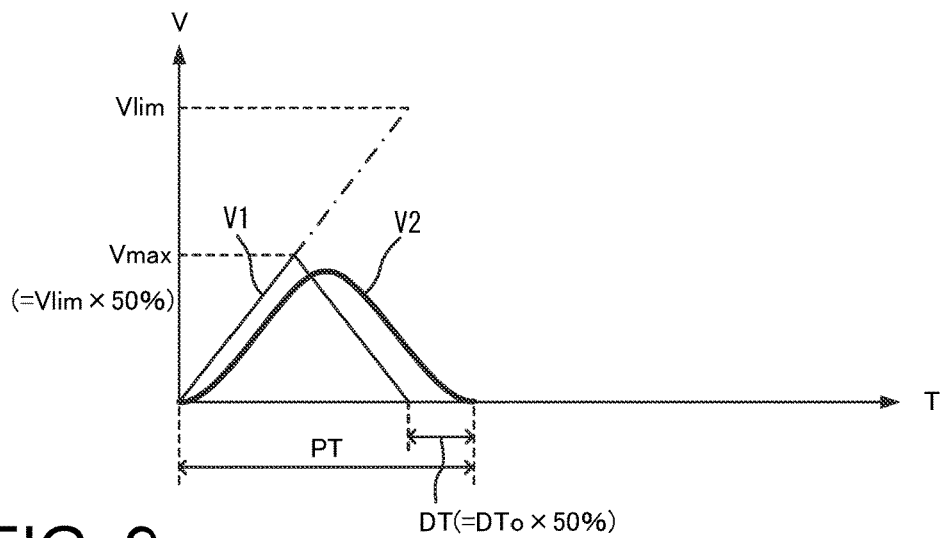
FIG. 8 is a waveform diagram illustrating an example of temporal changes in the command speed before smoothing and the command speed after smoothing when the maximum value of the command speed is 50% of the upper limit value.
Figure 9:
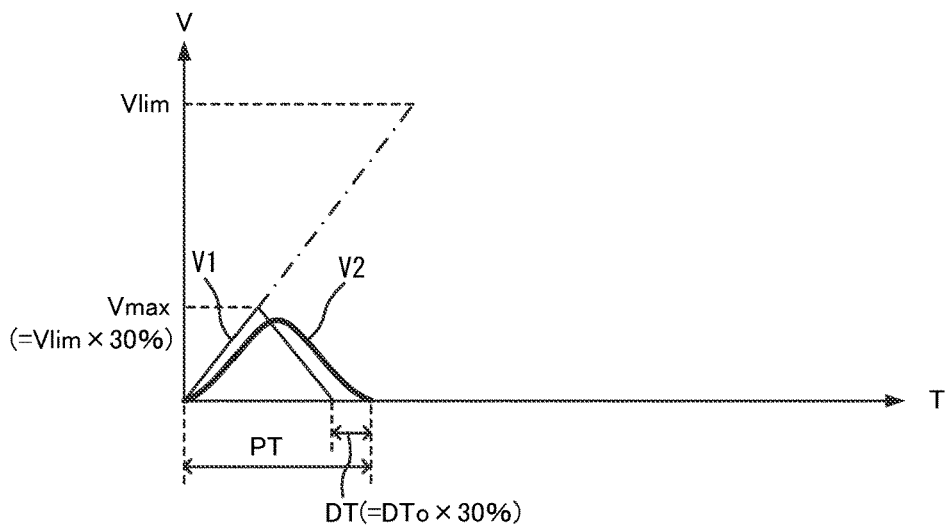
FIG. 9 is a waveform diagram illustrating an example of temporal changes in the command speed before smoothing and the command speed after smoothing when the maximum value of the command speed is 30% of the upper limit value.

FIGS. 7 to 9 show examples of the temporal change of the command speed V1 and the command speed V2 in the case of a minute movement amount. FIG. 7 shows a case where the maximum value Vmax of the command speed V1 is, for example, 70% of the upper limit value Vlim. In this case, the delay time DT is set to 70% of the initial value DTo on the basis of (Equation 1). Similarly, FIG. 8 shows a case where the maximum value Vmax of the command speed V1 is, for example, 50% of the upper limit value Vlim. In this case, the delay time DT is set to 50% of the initial value DTo based on (Equation 1). Similarly, FIG. 9 shows a case where the maximum value Vmax of the command speed V1 is, for example, 30% of the upper limit value Vlim. In this case, the delay time DT is set to 30% of the initial value DTo on the basis of (Equation 1). In this way, even in the case of a minute movement amount, the ratio of the delay time DT to the time PT until the positioning is completed can be suppressed to be small, and the influence of the delay time can be reduced.

Figure 10:
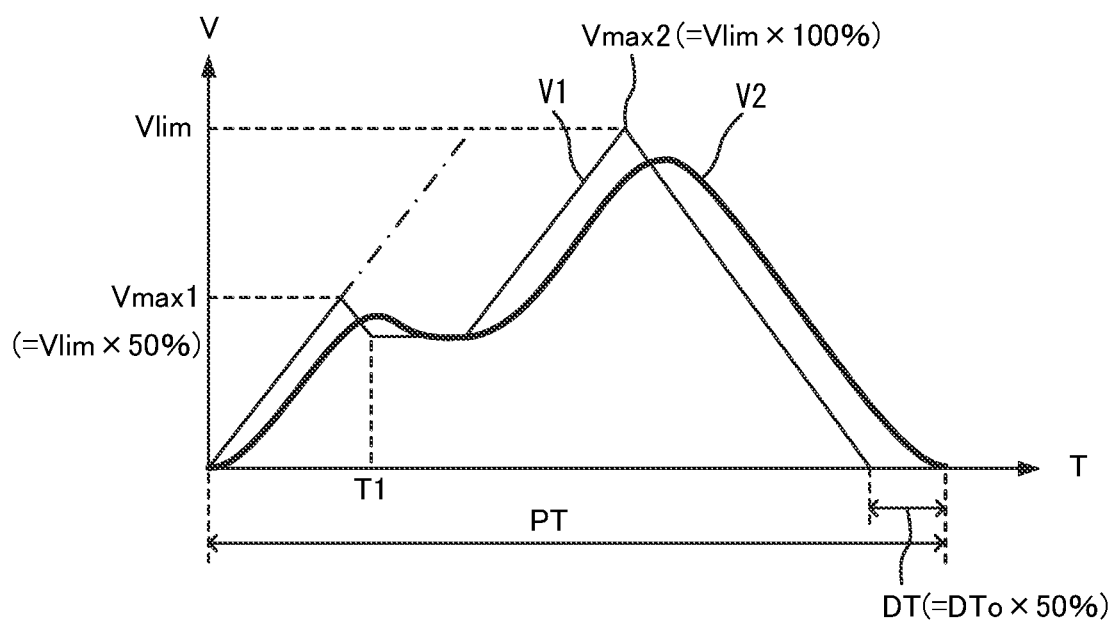
FIG. 10 is a waveform diagram illustrating an example of temporal changes in the command speed before smoothing and the command speed after smoothing when the movement amount is changed during the positioning operation of the servo motor.

FIG. 10 shows an example of the temporal change of the command speed V1 and the command speed V2 when the movement amount is changed during the positioning operation of the servo motor 11. In the example shown in FIG. 10, based on the movement amount before the change, the maximum value Vmax1 of the command speed V1 becomes, for example, 50% of the upper limit value Vlim, the delay time DT is set to 50% of the initial value DTo, and then the positioning operation of the servo motor 11 by the position command is performed. Thereafter, for example, the movement amount is changed at time T1, and based on the movement amount after the change, the maximum value Vmax2 of the command speed V1 is, for example, 100% of the upper limit value Vlim.

In such a case, if the position command is newly generated by changing the delay time DT, it is difficult to smoothly shift the operation by the position command calculated on the basis of the movement amount before the change to the operation by the position command calculated on the basis of the movement amount after the change, which causes vibration. In addition, in a case where a complicated operation is performed in order to ensure the continuity thereof, an increase in operation load is caused.

Therefore, in the present embodiment, the delay time DT is not changed as described above, and remains at 50% of the initial value DTo. As a result, after the change of the movement amount, the command speeds V1 and V2 are recalculated based on the changed movement amount and the delay time DT (initial value DTo×50%) set before the change of the movement amount. Then, the positioning operation of the servo motor 11 is performed by the position command generated based on the recalculated command speed V2. As a result, even movement amount is changed during the positioning operation, the occurrence of vibration can be prevented without performing complicated calculation.

Figure 11:
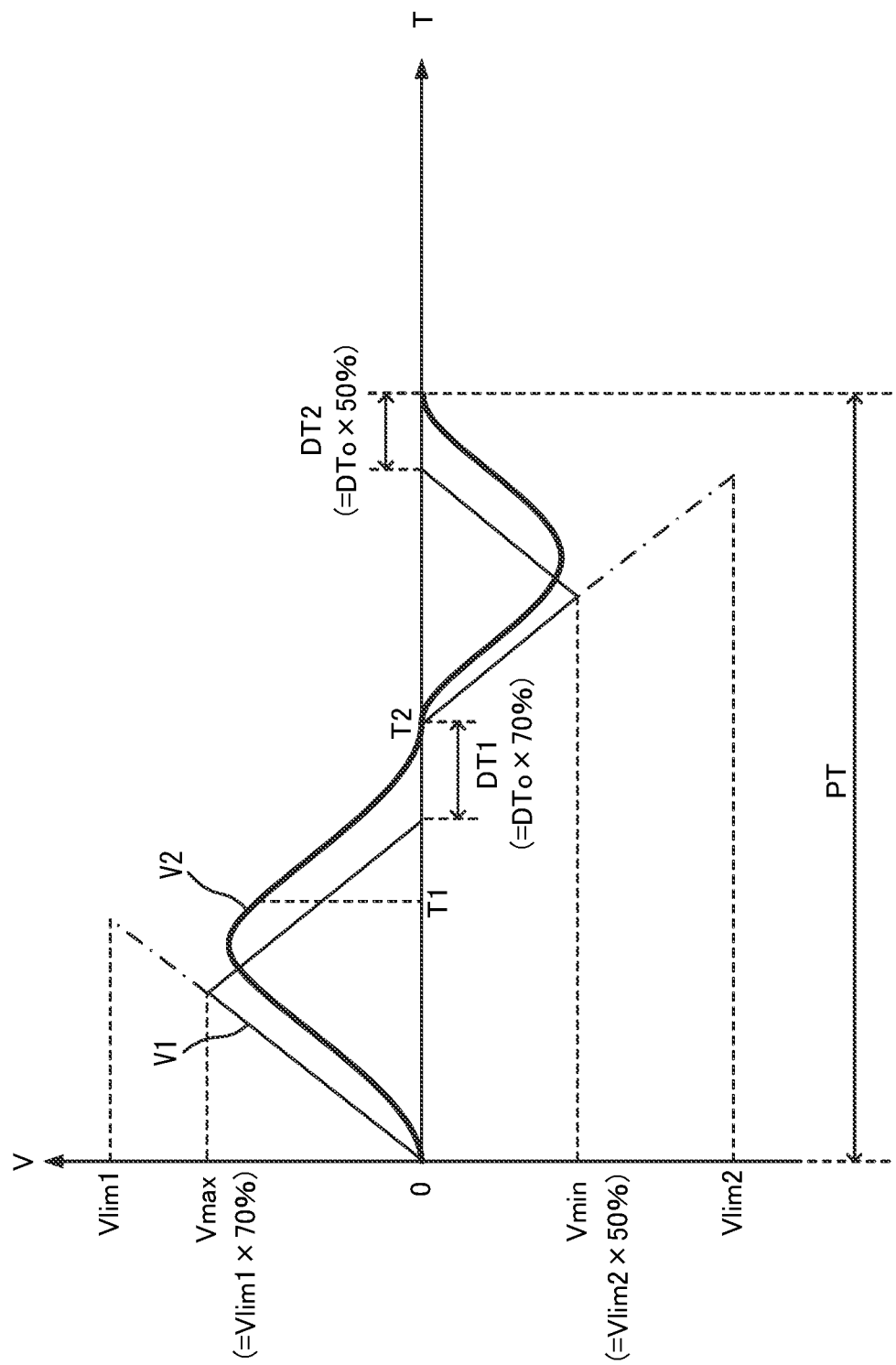
FIG. 11 is a waveform diagram illustrating an example of temporal changes in the command speed before smoothing and the command speed after smoothing in a case where the movement amount is changed during the positioning operation of the servo motor and the operation direction of the servo motor is reversed.

FIG. 11 shows another example of the temporal change of the command speed V1 and the command speed V2 when the movement amount is changed during the positioning operation of the servo motor 11. In the example shown in FIG. 11, based on the movement amount before the change, the maximum value Vmax of the command speed V1 is set to 70% of the upper limit value Vlim1, for example, and the delay time DT1 is set to 70% of the initial value DTo, and then the positioning operation of the servo motor 11 by the position command is performed. Thereafter, for example, the movement amount is changed at time T1, and the operation direction of the servo motor 11 is reversed by the change of the movement amount. In this case, the delay time DT is recalculated at a time T2 which is a timing at which the operation direction of the servo motor 11 is reversed (a timing at which the command speed V2 becomes 0).

In the example illustrated in FIG. 11, the minimum value Vmin of the command speed V1 is, for example, 50% of the lower limit value Vlim2 based on the movement amount after the change. Thus, the delay time DT2 is reset to 50% of the initial value DTo in the time DT2, and the command speeds V1 and V2 are recalculated based on the changed movement amount and the changed delay time DT2. Then, the positioning operation of the servo motor 11 is performed by the position command generated based on the recalculated command speed V2. In this way, even when the delay time DT is changed, it is possible to smoothly shift the operation by the position command based on the movement amount before the change to the operation by the position command based on the movement amount after the change, and it is possible to prevent the occurrence of vibration without performing complicated calculation.

4. Control Content of Command Generation Device

Next, with reference to FIG. 12, an example of control contents (command generation method) executed by the command generation device 5 will be described with reference to FIG. 12. Here, similarly to the above, for example, a case will be described in which the first command is the movement amount, the first intermediate data and the second intermediate data are the command speed V1, the second command is the position command, and the smoothing by moving average is performed will be described.

Figure 12:
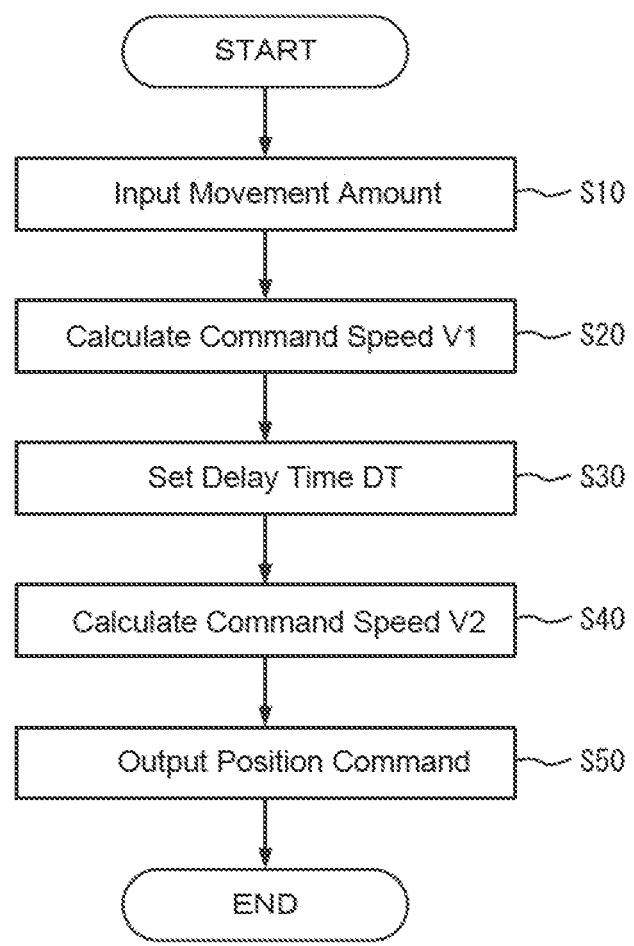
FIG. 12 is a flowchart showing an example of control contents executed by the command generation device.

As shown in FIG. 12, in step S10, the command generation device 5 inputs the movement amount for controlling the servo motor 11 output from the host control device 3 by the command input unit 13.

In step S20, the command generation device 5 causes the first intermediate data calculation unit 15 to calculate the command speed V1 based on the movement amount input in step S10.

In step S30, the command generation device 5 variably sets, by the delay time setting unit 19, a delay time DT by which a first completion time is delayed with respect to a second completion time based on the movement amount input in step S10, positioning of the motor being completed at the first completion time if the first command speed V1 calculated in step S20 is smoothed by moving average, the positioning of the motor according to the first command being completed at the second completion time if the command speed V1 is not smoothed by moving average. For example, the delay time setting unit 19 calculates the delay time DT by multiplying the initial value DTo of the delay time by the ratio of the maximum value Vmax to the upper limit value Vlim of the command speed V1 on the basis of (Expression 1) described above.

In step S40, the command generation device 5 calculates, by the second intermediate data calculation unit 21, the command speed V2 obtained by smoothing by the moving average on the command speed V1 calculated in step S20 based on the delay time DT set in step S30.

In step S50, the command generation device 5 outputs a position command for controlling the servo motor 11 to the motor control device 7 based on the command speed V2 calculated in step S40 by the command output unit 23. Thus, this flowchart is ended.

5. Advantageous Effects of Embodiment

As described above, the command generation device 5 according to the present embodiment includes the command input unit 13 that inputs the first command according to which the servo motor 11 is controlled, the first intermediate data calculation unit 15 that calculates the first intermediate data based on the first command, the delay time setting unit 19 that variably sets, based on the first command, the delay time DT by which a first completion time is delayed with respect to a second completion time, positioning of the motor according to the first command being completed at the first completion time if the first intermediate data is smoothed, positioning of the motor according to the first command being completed at the second completion time if the first intermediate data is not smoothed, the second intermediate data calculation unit 21 calculates the second intermediate data by smoothing the first intermediate data based on the delay time DT, and the command output unit 23 that outputs the second command according to which the servo motor 11 is controlled based on the second intermediate data.

In the present embodiment, the delay time DT when the smoothing is performed on the first intermediate data can be variably set based on the first command. Thus, since the delay time DT can be adjusted according to the first command, the delay time DT can be shortened, for example, when the first command has a minute movement amount. In addition, since the delay time DT can be adjusted according to the first command while maintaining the smooth waveform of the first intermediate data smoothed by the smoothing, it is possible to prevent the calculated intermediate data and the generated command from becoming discontinuous even in the case of a minute movement amount, and it is possible to suppress the occurrence of vibration. Therefore, even in the case of a very small amount of movement, the occurrence of vibration can be suppressed, and the time until positioning is completed can be shortened.

In the present embodiment, in particular, the delay time setting unit 19 sets the delay time DT to be shorter than the initial value DTo set in advance when the maximum value Vmax of the first intermediate data calculated based on the first command does not reach the upper limit value Vlim of the first intermediate data set in advance (in the case of a small movement amount). Thus, the following effects are obtained.

If the command generation device 5 is operated in a state where the delay time DT is fixed to the preset initial value DTo, for example, in a case where the first command has a relatively large movement amount, the ratio of the delay time DTo to the time PT until the positioning is completed becomes small, and thus the influence of the delay time is also small. On the other hand, for example, when the first command has a relatively small movement amount, the ratio of the delay time DTo to the time PT until the positioning is completed becomes large, and thus the influence of the delay time also becomes large. In other words, the smaller the amount of movement, the greater the proportion of delay time, and the more pronounced the effect.

In the present embodiment, the delay time DT is set to be shorter than the initial value DTo set in advance only in a case where the first command is a minute movement amount such that the maximum value Vmax of the first intermediate data does not reach the upper limit value Vlim. As a result, the delay time DT can be effectively shortened to reduce the influence thereof, and when the influence of the delay time DT is small, the adjustment is not performed to reduce the calculation load.

Particularly in the present embodiment, the delay time setting unit 19 calculates the delay time DT by multiplying the initial value DTo of the delay time DT by the ratio of the maximum value Vmax to the upper limit value Vlim of the first intermediate data.

In this way, when the first command has a relatively large movement amount such that the maximum value Vmax of the first intermediate data reaches the upper limit value Vlim, the delay time DT can be set as the initial value DTo without being changed. In addition, when the first command has a minute movement amount such that the maximum value Vmax of the first intermediate data does not reach the upper limit value Vlim, the delay time DT can be set to be shortened according to the movement amount. Such variable setting of the delay time DT can be realized by a simple operation.

Particularly in the present embodiment, the delay time setting unit 19 calculates the delay time DT when the first command is input by the command input unit 13 while the second command is not output by the command output unit 23. Thus, the following effects are obtained.

That is, in the present embodiment, the first intermediate data calculation unit 15 calculates the first intermediate data until the positioning is completed, the delay time setting unit 19 sets the delay time DT based on the first intermediate data, the second intermediate data calculation unit 21 calculates the second intermediate data until the positioning is completed based on the delay time DT, and the command output unit 23 starts outputting the second command. In this way, before the second command is output and the positioning of the servo motor 11 is started, all the command data until the positioning is completed are generated in advance. Therefore, it is possible to avoid a complicated command generation operation during the positioning operation, and it is possible to avoid a possibility that intermediate data and generated command becomes discontinuous due to the complicated command generation calculation.

In the present embodiment, in particular, when the first command is changed by the command input unit 13 in a state in which the second command is output by the command output unit 23, the delay time setting unit 19 calculates the delay time DT at a timing at which the operation direction of the servo motor 11 is reversed. Thus, the following effects are obtained.

That is, when the first intermediate data changes due to a change in the first command (for example, a change in the movement amount, the target position, or the target speed) during the positioning operation, if the second intermediate data is newly calculated by changing the delay time DT, it is difficult to smoothly shift the operation based on the second command calculated based on the first command before the change to the operation based on the second command calculated based on the first command after the change, which causes vibration. In addition, in a case where a complicated operation is performed in order to ensure the continuity thereof, an increase in operation load is caused.

Therefore, when the operation direction of the servo motor 11 is reversed by the change of the first command, the delay time DT is changed at the timing of the reversal to newly calculate the second intermediate data, and the output of the new position command based on the calculated second intermediate data is started at the timing of the reversal. Thus, the operation by the second command based on the first command before the change can be smoothly shifted to the operation by the second command based on the first command after the change, and the occurrence of vibration can be prevented without performing complicated calculation.

In the present embodiment, in particular, the delay time setting unit 19 variably sets, based on the first command, the delay time DT by which a first completion time is delayed with respect to a second completion time, positioning of the motor according to the first command being completed at the first completion time if the first intermediate data is smoothed by moving average, the positioning of the motor according to the first command being completed at the second completion time if the first intermediate data is not smoothed by moving average.

When the smoothing where the smoothing based on the moving average is performed, there is a characteristic that the positioning completion time PT is delayed as compared with that before the smoothing is performed. In the present embodiment, since the delay time DT can be variably set based on the first command, the time PT until the positioning is completed can be shortened.

Particularly in this embodiment, the command input unit 13 inputs the amount of movement for controlling the servo motor 11, the first intermediate data calculation unit 15 calculates the command speed V1 based on the amount of movement, the delay time setting unit 19 variably sets the delay time DT based on the amount of movement, the delay time DT by which a first completion time is delayed with respect to a second completion time, positioning of the motor according to the amount of movement being completed at the first completion time if the command speed V1 is smoothed by the moving average, the positioning of the motor according to the amount of movement being completed at the second completion time if the command speed V1 is not smoothed by the moving average. The second intermediate data calculation unit 21 calculates the command speed V2 obtained by smoothing the command speed V1 based on the delay time DT, and the command output unit 23 outputs the position command according to which the servo motor 11 is controlled based on the command speed V2.

In the present embodiment, the delay time DT in the case where the command speed V1 is smoothed based on the moving average can be variably set based on the movement amount. Thus, since the delay time DT can be adjusted according to the movement amount, the delay time DT can be shortened when the movement amount is minute, for example. In addition, since the delay time DT can be adjusted according to the movement amount while maintaining the smooth waveform of the command speed V2 that is smoothed, it is possible to adjust the delay time DT based on the movement amount such that the command speed V2 and the generated command can be prevented from becoming discontinuous even when the movement amount is minute, and it is possible to suppress the occurrence of vibration. Therefore, even in the case of a minute movement amount, the occurrence of vibration can be suppressed, and the time PT until positioning is completed can be shortened.

6. Hardware Configuration Example of Command Generation Device 5

Next, a hardware configuration example of the command generation device 5 will be described with reference to FIG. 13.

Figure 13:
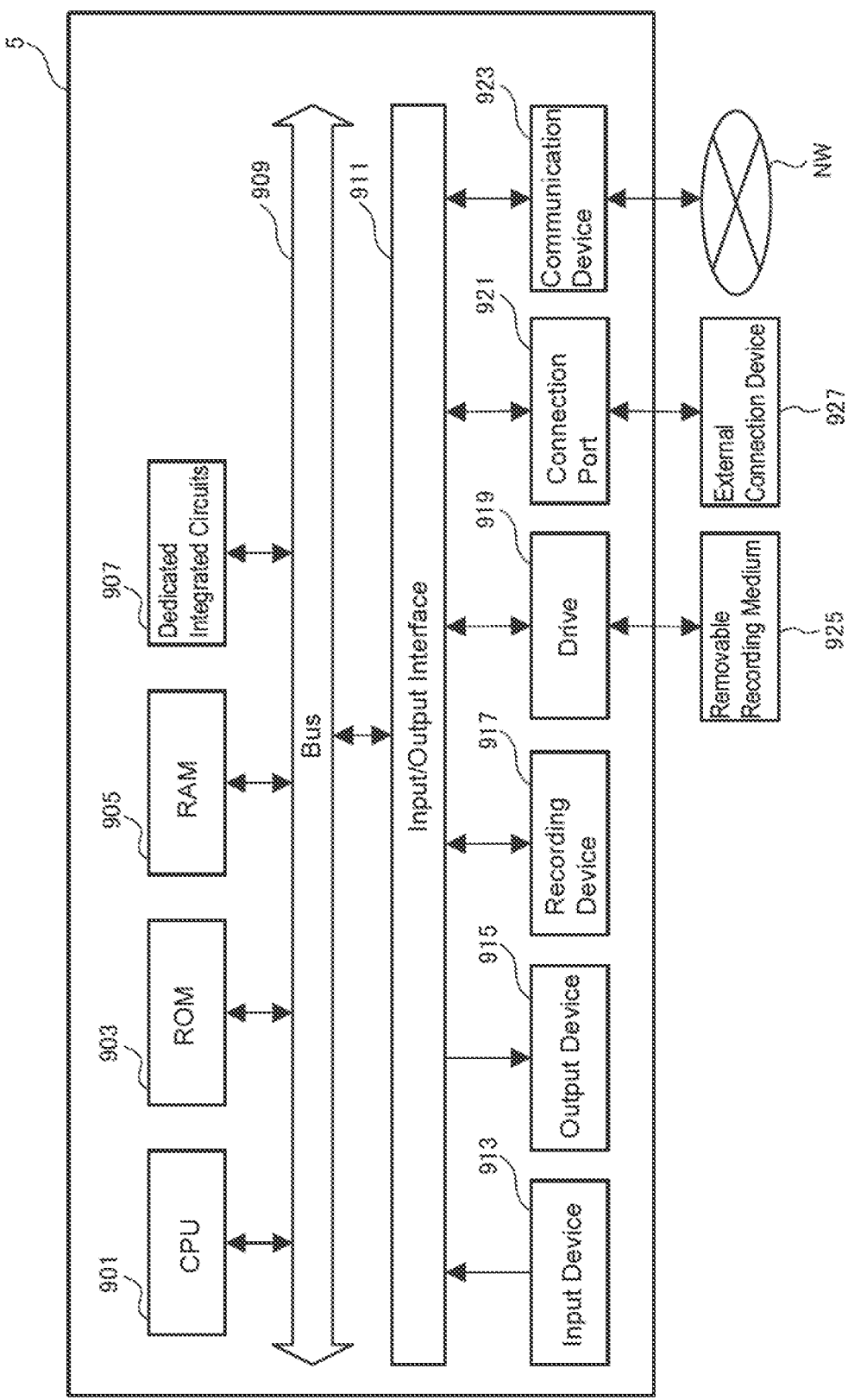
FIG. 13 is a block diagram showing an example of a hardware configuration of the command generation device.

As illustrated in FIG. 13, the command generation device 5 includes, for example, CPU901, ROM903, RAM905, dedicated integrated circuits 907 constructed for specific applications such as ASICs or FPGAs, an input device 913, an output device 915, a recording device 917, a drive 919, a connection port 921, and a communication device 923. These components are connected to each other via a bus 909 and an input/output interface 911 so that signals can be transmitted therebetween.

The program can be recorded in, for example, a ROM903, a RAM905, or the recording device 917 including the recording unit 17 and constituted by a hard disk or the like.

In addition, the program may be temporarily or non-temporarily (permanently) recorded in a removable recording medium 925 such as a magnetic disk including a flexible disk, an optical disk such as various CDs, MO disks, or DVDs, or a semiconductor memory. Such a recording medium 925 can also be provided as so-called package software. In this case, the program recorded in the recording medium 925 may be read by the drive 919 and recorded in the recording device 917 via the input/output interface 911, the bus 909, or the like.

Further, the program may be recorded in, for example, a download site, another computer, another recording device, or the like (not shown). In this case, the program is transferred via a network NW such as a LAN or the Internet, and the communication device 923 receives the program. The program received by the communication device 923 may be recorded in the recording device 917 via the input/output interface 911, the bus 909, or the like.

The program can also be recorded in, for example, an appropriate external connection device 927. In this case, the program may be transferred via an appropriate connection port 921 and recorded in the recording device 917 via the input/output interface 911, the bus 909, or the like.

The CPU901 executes various processes in accordance with the program recorded in the recording device 917, thereby realizing the processes by the command input unit 13, the first intermediate data calculation unit 15, the delay time setting unit 19, the second intermediate data calculation unit 21, the command output unit 23, and the like. At this time, the CPU901 may directly read the program from the recording device 917 and execute the program, or may load the program into the RAM905 and execute the program. Furthermore, when the CPU901 receives a program via the communication device 923, the drive 919, or the connection port 921, for example, the received program may be directly executed without recording the program in the recording device 917.

If necessary, the CPU901 may perform various processes based on signals and information input from the input device 913 such as a mouse, a keyboard, and a microphone (not shown).

Then, the CPU901 may output the result of executing the above-described processing from an output device 915 such as a display device or an audio output device. Further, the CPU901 may transmit the processing result via the communication device 923 or the connection port 921 as necessary, or may record the processing result in the recording device 917 or the recording medium 925.

In addition to the methods described above, the methods according to the embodiments and the modified examples may be appropriately combined and used. In addition, although not illustrated one by one, the above-described embodiment and each modification example are implemented by adding various changes within a range not departing from the gist thereof.

What is claimed is:

1. A command generation device to control a motor, comprising:
   command input circuitry configured to receive a first command;
   first intermediate data calculation circuitry configured to calculate first intermediate data based on the first command;
   delay time setting circuitry configured to determine a delay time based on the first command, a first time period during which positioning the motor based on the first command is completed when the first intermediate data is smoothed being longer by the delay time than a second time period during which positioning the motor based on the first command is completed when the first intermediate data is not smoothed;
   second intermediate data calculation circuitry configured to calculate second intermediate data by smoothing the first intermediate data based on the delay time; and
   command output circuitry configured to calculate, based on the second intermediate data, a second command according to which the motor is controlled.

2. The command generation device according to claim 1, wherein the delay time setting circuitry is configured to determine the delay time to be shorter than an initial value when a maximum value of the first intermediate data calculated based on the first command does not reach a upper limit value of the first intermediate data.

3. The command generation device according to claim 2, wherein the delay time setting circuitry is configured to calculate the delay time by multiplying the initial value of the delay time by a ratio of the maximum value to the upper limit value of the first intermediate data.

4. The command generation device according to claim 3, wherein the delay time setting circuitry is configured to calculate the delay time when the command input circuitry receives the first command while the command output circuitry does not output the second command.

5. The command generation device according to claim 4, wherein the delay time setting circuitry is configured to calculate the delay time at a timing at which an operation direction of the motor is reversed when the first command is changed by the command input circuitry while the command output circuitry outputs the second comm.

6. The command generation device according to claim 1, wherein the first intermediate data is smoothed with moving average.

7. The command generation device according to claim 6, wherein
   the first command includes a movement amount of the motor,
   the first intermediate data includes a first command speed of the motor,
   positioning the motor is performed based on the movement amount, and
   the first command speed is smoothed by moving average.

8. The command generation device according to claim 2, wherein the first intermediate data is smoothed with moving average.

9. The command generation device according to claim 3, wherein the first intermediate data is smoothed with moving average.

10. The command generation device according to claim 4, wherein the first intermediate data is smoothed with moving average.

11. The command generation device according to claim 5, wherein the first intermediate data is smoothed with moving average.

12. A command generation method to control a motor, comprising:
    receiving a first command;
    calculating first intermediate data based on the first command;
    determining a delay time based on the first command, a first time period during which positioning the motor based on the first command is completed when the first intermediate data is smoothed being longer by the delay time than a second time period during which positioning the motor based on the first command is completed when the first intermediate data is not smoothed;
    smoothing the first intermediate data based on the delay time to obtain second intermediate data; and
    calculating, based on the second intermediate data, a second command according to which the motor is controlled.

* * * * *